(12) United States Patent
Penders

(10) Patent No.: US 6,880,080 B1
(45) Date of Patent: Apr. 12, 2005

(54) METHOD TO PROVIDE AUTHORIZATION FROM A CERTIFYING AUTHORITY TO A SERVICE PROVIDER USING A CERTIFICATE

(75) Inventor: Alain Penders, Diepenbeek (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/354,161

(22) Filed: Jul. 16, 1999

(30) Foreign Application Priority Data

Jun. 28, 1999 (EP) .............................................. 99401613

(51) Int. Cl.[7] ............................ H04L 9/00; G06F 17/30
(52) U.S. Cl. ....................... 713/156; 713/168; 713/201; 380/270; 380/29; 380/30; 455/410
(58) Field of Search ................................ 713/156, 165, 713/201, 168; 380/270, 29–30; 455/410

(56) References Cited

U.S. PATENT DOCUMENTS

| | | | |
|---|---|---|---|
| 5,412,717 A | | 5/1995 | Fischer |
| 5,745,574 A | * | 4/1998 | Muftic ......................... 380/23 |
| 5,978,484 A | * | 11/1999 | Apperson et al. ............. 380/25 |
| 6,463,534 B1 | * | 10/2002 | Geiger et al. ................ 713/168 |

FOREIGN PATENT DOCUMENTS

WO     WO 96/02993     2/1996

OTHER PUBLICATIONS

"Frequently Asked Questions About Today's Cryptography", v4.0, by RSA Laboratories, RSA Data Security 1998.
WAP WTLS, Version Apr. 30, 1998, Wireless Application Protocol, Wireless Transport Layer Security Specification.
Wireless Application Protocol Wireless Markup Language Script WMLScript Language Specifications, version Apr. 30, 1998, WAP Wireless Application Protocol Forum.
"Wireless Application Protocol Wireless Telephony Application Interface Specification" WAP forum, Apr . 30, 1998.
"Wireless Application Protocol WMLScript Standard Libraries Specifications" WAP Forum, Apr. 30, 1998.
Wireless Application Protocol Wireless Telephony Application Interface Specification, GSM Global System for Mobile Telecommunication Specific Addendum, WAP Forum, Apr. 30, 1998.
Wireless Application Protocol Wireless Telephony Application Interface Specification, IS–136 specific Addendum, WAP Forum, Apr. 30, 1998.
Wireless Application Protocol Wireless Telephony Application Interface Specification, PDC Specific Addendum, by WAP Forum, Apr. 30, 1998.
Taylor A.: "Over–the–Air Service Provisioning" Annual Review of Communications, XP000793196.

* cited by examiner

Primary Examiner—Ayaz Sheikh
Assistant Examiner—Taghi T. Arani
(74) Attorney, Agent, or Firm—Sughrue Mion, PLLC

(57) ABSTRACT

A method for use in telecommunication environment that provides authorization by a certifying authority to a service provider whereby the service provider is allowed to execute predefined functionality when a service is provided by the service provider to a terminal of a user. The method delivers a certificate from the certifying authority to the service provider. The method defines, in the certificate, a definition of the predefined allowed functionality that is part of a global functionality supported in the telecommunication environment.

14 Claims, 1 Drawing Sheet

METHOD TO PROVIDE AUTHORIZATION FROM A CERTIFYING AUTHORITY TO A SERVICE PROVIDER USING A CERTIFICATE

BACKGROUND OF THE INVENTION

The present invention relates to a method to provide authorization by a certifying authority to a service provider to execute predefined functionality when a service is provided by the service provider to a terminal of a user, the method including the step of delivering a certificate, to a certifying authority. The present invention is also related to a terminal, a service provider and a certificate realizing the method and to a telecommunication network comprising a certifying authority, a terminal and a service provider.

Such a method for use in a telecommunication environment to provide authorization by a certifying authority to a service provider to execute predefined functionality in the event when a service is provided by the service provider to a terminal of a user, is already known in the art. Indeed, in such an event the certifying authority delivers a certificate to the service provider that provides the service provider the authorization to execute all the functionality of the telecommunication environment. Such a certificate is explained in the 'Frequently asked questions about today's cryptography, version 4.0" published by RSA laboratories, a division of RSA Data Security in 1998. Herein, the answer to question 4.1.3.10. 'What are certificates' describes the object of a certificate. Certificates are digital documents attesting to the binding of a public key to an individual or other entity. They allow verification of the claim that a specific key does in fact belong to a specific individual. Certificates help to prevent someone from using a phony key to impersonate someone else. Certificates are typically used to generate confidence in the legitimacy of a public key. In some cases it may be necessary to create a chain of certificates, each one certifying the previous one until the parties involved are confident in the identity in question. Such a certificate contains a public key and name. As commonly used, a certificate also contains an expiration date, the name of the certifying authority that issued the certificate and a serial number. Most importantly, it contains the digital signature of the certificate issuer. The most widely accepted format for certificates is defined by the ITU-T X.509 international standard. Thus certificates can be read or written by any application complying with X.509.

Another application of certificates is described in the WAP WTLS, Version 30-Apr. 1998, Wireless Application Protocol, Wireless Transport Layer Security specification. Herein the content of such a certificate is described at page 57, paragraph 10.5.2: a version of the certificate, the algorithm used to sign the certificate, the certification authority who signed the certificate, the validity period of the certificate, the owner of the key, the type of the key, parameters relevant for the public key and the public key that is being certified. The use of such certificates is described now in the following paragraph.

A service provider can send a service to a terminal of a user. These services can contain functions that do e.g. call control on the phone whereby any service provider can take over control of the phone e.g. make calls and accept or reject calls. In order to prevent malicious service providers from abusing someone's phone, a certificate based authentication system is used. Only if the service provider can present a certificate that is signed by a certifying authority e.g. a telecommunication network operator, the service provider is allowed access to these dangerous functions. The service provider is allowed to use predefined functionality when the service is provided by the service provider to a terminal of the user.

It has to be remarked that the expression 'a service is provided by the service provider' means that for instance the content of a service is executed by a terminal of the user. When such predefined function is to be executed by the terminal, first, the terminal controls the presence of a signed certificate for the service provider. When such certificate is available the function might be executed without e.g. any danger for abuse of the terminal.

A further remark is that a certifying authority can be a network operator itself. However, according to actual trends, such certifying authority can be a service provider itself that provides the service to a network operator of the management of giving or refusing such certificates.

Yet, it has to be remarked that the verification of the existence of a signed certificate implies different steps like a certification process, a certificate distribution and validation whereby public key/private key PKI algorithms are involved in order to provide a digital signing of the certificate. These steps are known steps to a person skilled in the art and are therefor not described in details here. The aim is the signing of a certificate and the fact that this signature can be controlled.

A problem outstanding with the existing certificates is that they are all or nothing solutions. This means that a service provider can get access to all functions or to no function i.e. a certificate is delivered or no certificate is delivered by the certifying authority.

Such a situation is often not sufficient for a network operator. Indeed, a network operator can not risk that a service provider may eventual by accident disable services to some terminals.

The problem becomes more clear with the following example. Presume a situation where a network operator trusts some service provider enough to let him modify the digital personal telephone book of a user, but the network operator does not trust the service provider enough to give him access to all functionality i.e. delivering a certificate. A solution to this problem is to add this function to the public library. This means that the network operator allows the use of this function by all service providers according to predefined specifications e.g. specifying the function in such a way that the user is previously asked permission by a service provider to add a predefined entry in its telephone book. However, in such an event, also service providers that are trusted completely should work with the public function. Otherwise, both functions must be created i.e. one public function and one non-public function. This is resulting in a very complex, resource expensive and still not completely satisfying specification.

SUMMARY OF THE INVENTION

The object of the invention is to provide a method to provide authorization by a certifying authority to a service provider to execute predefined functionality, such as the above known methods, but which does not have the above mentioned drawbacks of dividing service providers into trusted or not trusted service providers.

The invention solves the problem by dividing the service providers into more detailed categories by giving a service provider access only to well specified functionality. This is realized by comprising in the certificate of a service provider a definition of the predefined functionality which is allowed to be executed by the service provider and which is part of the global functionality that supports the telecommunication environment.

Indeed, by storing detailed information inside the certificate that is signed by the certifying authority, fine grained access control by the operator is possible. This drastically reduces the risk for an operator. In this way, a service provider can be allowed to use e.g. a predefined telephone function on a terminal without being able to damage the terminal or the network.

It has to be remarked that according to the prior art solutions a terminal controls first the presence of a signed certificate before its executes an included function of a service provided by a service provider. According to the present invention, the terminal controls not only the presence of a signed contract but also the presence of the definition of a predefined function in the signed contract before it executes the function in the event when a service is provided that includes this function.

A drawback of the present invention is however that the certificate gets larger by comprising a definition of the allowed functionality. To overcome this deficiency, a hierarchical tree-like structure is used. Indeed, by introducing a hierarchical tree-like structure in the organization of the global functionality the definition of the predefined allowed functionality can at least partly be realized by a definition of a branch of the structure. Hereby authorization is provided to predefined functions of the predefined functionality that are related to the branch. In this way also libraries identifiers and function identifiers as defined by the wireless mark-up script language can be used to be mentioned in order to provide authorization for, one function, all functions from one library or all functions in all libraries: e.g., enable-all, enable-library-identifier, enable-function-identifier.

Another aspect of the present invention is the definition of the predefined allowed functionality in the certificate. Herein it is described that the definition of the predefined functionality is at least partly realized by a revocation of part of the global functionality. This is e.g. implemented by using not only an 'enable' function with an allowed function as argument but also by using an 'disable' function with a revoked function as argument. Herewith, authorization to all functions of a library except one can easily be realized by enabling the library and disabling the revoked function.

The definition of the predefined functionality comprises definitions of wireless mark-up script language. Indeed, such implementation takes the advantage of making use of already existing and defined functions in a common known scripting language. These functions are described in a specification:'Wireless Application Protocol Wireless Markup Language Script WMLScript Language Specifications, version 30 April 1998 published by the WAP Wireless Application Protocol Forum.'

Another example of existing script language functions is provided e.g. by the Javascript language functions.

Furthermore, as already mentioned above, the Wireless Telephony Application Interface libraries are organizing wireless mark-up script language functions into predefined functions and libraries such as call control, sending of short messages or managing a phone book. These functions and libraries of the wireless telephony application functions can also be used to define the allowed predefined functionality in the certificate. They are specified in the 'Wireless Application Protocol Wireless Telephony Application Interface specifications, from the WAP forum and published at Apr. 30, 1998.'

Yet the definitions of standard functions of a terminal are introduced into the definition of the allowed predefined functionality. Indeed, by introducing standard functions as specified according to the 'Wireless Application Protocol WMLScript Standard Libraries Specifications, published by the WAP Forum at Apr. 30, 1998' a service provider is allowed to use this standard functionality in order to provide e.g. calculator application.

Finally it has to be remarked that the above mentioned WTAI functions as defined above are known to a person skilled in the art. These functions are valid for common known mobile terminals. However, additional functions can be defined in addition to the WTAI specifications according to the type of network used. An example is provided for a GSM addendum, an IS-136 (TDMA Time Division Multiple Access Cellular PCS Personal Communication System Radio Interface-Mobile Station-Base Station-compatibility) addendum and a PDC Pacific Digital Cellular addendum for WTAI, which are specified, respectively, in:

Wireless Application Protocol Wireless Telephony application Interface specification, GSM Global system for Mobile Telecommunication specific Addendum, published by the WAP forum at Apr. 30, 1998; and Wireless Application Protocol Wireless Telephony application Interface specification, IS-136 specific Addendum, published by the WAP forum at Apr. 30, 1998; and Wireless application Protocol wireless Telephony application Interface Specification, PDC specific Addendum, published by the WAP forum, Apr. 30, 1998.

It should be noticed that the term "comprising", used in the claim, should not be interpreted as being limitative to the means listed thereafter. Thus, the scope of the expression "a device comprising means A and B" should not be limited to devices consisting only of components A and B. It means that with respect to the present invention, the only relevant components of the device are A and B.

Similarly, it is to be noted that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that their exists a path between an output A and an input B which may be a path including other devices or means.

BRIEF DESCRIPTION OF THE DRAWINGS

The above and other objects and features of the invention will become more apparent and the invention itself will be best understood by referring to FIG. 1 which illustrates a telecommunication network.

DETAILED DESCRIPTION OF THE INVENTION

Figure 1:
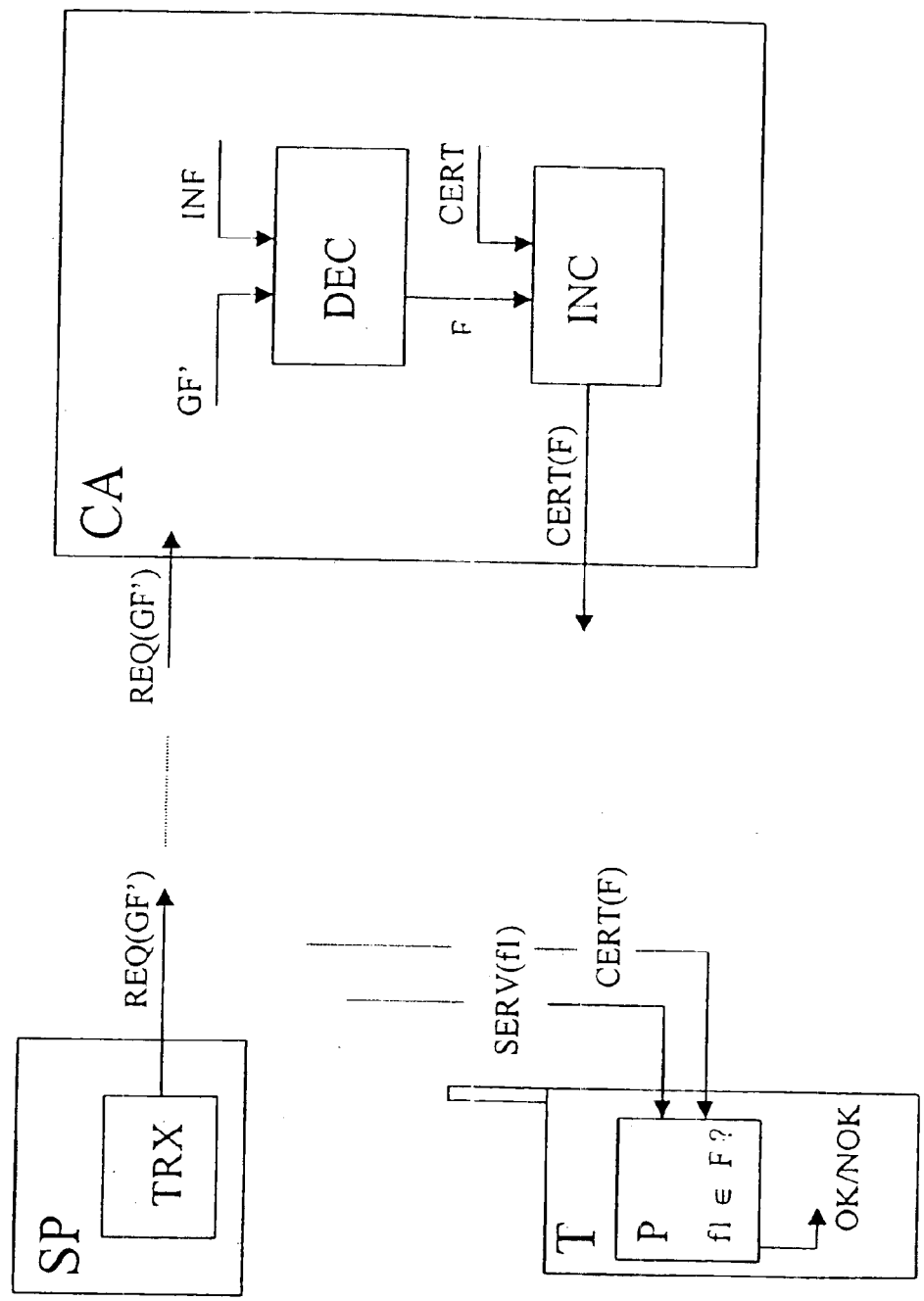

First, the working of the method of the present invention will be explained by means of a functional description of the functional blocks shown in FIG. 1. Based on this description, implementation of the functional blocks will be obvious to a person skilled in the art and will therefor not be described in further detail. In addition, the principle working of the method to provide authorization will be described.

Referring to FIG. 1, a telecommunication environment is shown. The telecomnnunication environment comprises a certifying authority CA, a terminal T of a user and a service provider SP.

The certifying authority CA is coupled via a telecommunication network to the service provider SP and to the terminal T. Also the service provider SP and the terminal T are coupled to each other via the telecommunication network. However, in order not to overload FIG. 1, this telecommunication network in FIG. 1 only shown in a simple way of inputs and outputs of the different included elements. Furthermore it has to be understood that it is clear to a person skilled in the art that such a telecommunication network includes more than one service provider SP, more than one terminal T and even might include more than one certifying authority. Since the invention can be explained only by mentioning the different above elements more elements are not shown in FIG. 1.

The certifying authority CA comprises a decider DEC and an including means INC coupled thereto. The decider DEC is coupled between an input of the certifying authority CA and the including means INC. The including means INC is on its turn coupled to an output of the certifying authority CA.

The decider DEC is included to decide whether the service provider SP is entitled to execute at least part of the global functionality GF' of the telecommunication environment. In order to make this decision the decider DEC makes use of predefined information. This information can be implemented by means of a memory e.g. a database that keeps track of the different service providers and its allowed functionality. On the other hand an operator of the certifying authority CA might give an input in order to provide the predefined information only in the event when the question arises. The decider DEC is enabled to make decisions regarding the global functionality of the telecommunication environment according to predefined rules and conditions. This means that eventual e.g. for part of the global functionality GF the question never arises since the involved network operator prefers to keep this part only for its own purposes. On the other hand, the decider DEC is able to take requests of the service providers into account. In this way the decider DEC is enabled to make only a decision for the requested functionality by a service provider SP and saves hereby processing time. The decider DEC provides a result of its decision that is the allowed functionality F. The allowed functionality is provided by the decider DEC to the including means INC.

The including means INC comprises the allowed functionality F into the certificate CERT. According to this preferred embodiment this is realized with three predetermined functions: enable, disable and all. The inclusion means INC uses these predetermined functions upon the list of global functionality GF. The global functionality GF is organized in an hierarchical tree-like structure. The structure comprises libraries i.e. the branches of the tree and functions i.e. the ends of the branches. The libraries and the functions are used as the arguments of the predetermined functions. In this way, the including means INC is enabled to comprise the result of the decider DEC in a clear and concise way into the certificate CERT. The certificate is transmitted to the service provider SP but is also transmitted to other locations into the network. Indeed, it has to be explained that, as it is known to a person skilled in the art, these certificates might be consulted on predefined public locations in the telecommunication environment.

The service provider SP comprises a transmitter TRX. The transmitter is coupled to an output of the service provider SP. The transmitter TRX is included to transmit a request REQ(GF') of the service provider SP that includes a definition of the functionality where for the service provider SP desires access.

This request REQ(GF') is transmitted to the certifying authority CA. As it is known to a person skilled in the art, a service provider SP also receives a response of the certifying authority CA. In the event when the service provider SP is allowed to receive a certificate CERT, the certificate includes according to the present invention a definition of the allowed functionality F.

The terminal T comprises a processor P. The processor is included to verify the presence and the content of a certificate. Indeed, in the event when a user desires to use a service SERV of the service provider SP and this service comprises the execution of a predefined function f1, the certificate CERT will first be checked upon the authorization of this execution. Therefor the certificate CERT is extracted from the predefined location in the network. This checking might be performed at the moment when the service SERV is being provided but might be as well executed in advance. Indeed, it is possible that the user used this service SERV some time ago and that the certificate was already checked by that time. In this way, the result might still be stored in a cache of the terminal T. On the other hand, it might as well be the content of the certificate that is still stored in a cache of the terminal T whereby the certificate CERT(F) does not need to be extracted from a predefined location in the network anymore.

The processor P provides hereby a result OK/NOK that authorizes or revokes, respectively, the access to the function f1 whilst the service SERV is executed.

The following paragraph describes the principle working of the present invention.

Presume a situation wherein the service provider SP wants to provide a service SERV that comprises the function f1 call set-up. The service provider SP never provided such a service SERV that includes this functionality, so the service provider SP first has to get to permission to access the call set-up function of a terminal T. The service provider SP transmits a request REQ with its transmitter TRX to the certifying authority CA. For this particular embodiment it is preferred to work with a certifying authority CA that only takes into account the requested functions. In this way the certifying authority saves processing time. Thus, the service provider SP comprises in its request the required functionality GF' i.e. the call set-up function f1. The certifying authority CA receives the request from the service provider SP and decides by means of its decider DEC whether the authorization is allowed. The decider DEC takes here for predefined information INF into account. According to this predefined information INF the service provider SP is a trustable service provider and is allowed by the decider DEC to execute the call set-up function when providing a service SERV to a user. The decider provides this result to the including means INC. The including means INC comprises this result into a prepared certificate CERT for the service provider SERV. The including means INC uses the enable predetermined function in order to provide authorization to the functionality related to the call set-up function f1. The definition becomes: enable-library(WTAI.WTAcall-handling). The certificate is provided by the certifying authority CA to the service provider SP and is also distributed into the network towards a predefined location.

In the event when a user desires to make use of the service SERV of the service provider SP, at a certain moment during execution of the different steps of the service SERV the terminal T will be requested to execute the function f1 call set-up function. In stead of executing this functionality immediately the terminal T will request for the existence of a certificate CERT(F) from the service provider SP. Since the terminal can find the certificate CERT at the predefined location into the network, the terminal T will download the certificate CERT. Whilst the certificate CERT is controlled upon its signature it will also be checked by the processor P of the terminal T upon the definitions of the allowed functionality F. Since the certificate CERT of the service provider indeed comprises the definition of the call set-up functionality F, the execution of the function f1 call set-up is allowed. This result is stored in a cache of the terminal T and the terminal T proceeds the execution of the desired service SERV by executing the call-set up function f1.

While the principles of the invention have been described above in connection with specific apparatus, it is to be clearly understood that this description is made only by way of example and not as a limitation on the scope of the invention, as defined in the appended claims.

What is claimed is:

1. A method for use in a telecommunication environment to provide authorization by a certifying authority to a service provider to execute predefined functionality when a service is provided by said service provider to a terminal of a user, said predefined functionality being part of a global functionality supported in said telecommunication environment, said method comprises:

said service provider forwarding a request to said certifying authority for said authorization, said request comprising a definition of at least part of said global functionality;

including in said certificate a definition of said predefined functionality if said request is granted by said certifying authority; and delivering said certificate.

2. The method according to claim 1, wherein said global functionality is organized according to a hierarchical tree-like structure and that said definition of said predefined functionality is at least partly realized by a definition of a branch of said structure whereby authorization is provided to predefined functions of said predefined functionality that are related to said branch.

3. The method according to claim 1, wherein said definition of said predefined functionality being at least partly realized by a revocation of part of said global functionality.

4. A certifying authority to realize the method according to claim 1, wherein said certifying authority comprises decision means to decide according to predefined information whether said service provider is entitled to execute at least part of said global functionality and to provide thereby an allowed functionality, and inclusion means coupled thereto to include in said certificate a definition of said allowed functionality, said allowed functionality being constituted by said predefined functionality.

5. A telecommunication network, wherein said telecommunication network comprises any one of a certifying authority, a terminal and a service provider according to claim 4.

6. A terminal to realize the method according to claim 1, wherein said terminal comprises processing means to check said certificate upon a presence of a definition of a function of said global functionality before execution of said function and to provide thereby any one of authorization and revocation of the execution of said function by said service provider in the event when said service is provided by said service provider to said terminal.

7. A service provider to realize the method according to claim 1, wherein said service provider comprises transmitting means to forward said request to said certifying authority in order to receive said authorization.

8. A certificate to realize the method according to claim 1, wherein said certificate comprises a definition of said predefined functionality being part of a global functionality supported in said telecommunication environment.

9. The method according to claim 1, wherein said definition of said predefined functionality comprises definitions of wireless markup script language.

10. The method according to claim 1, wherein said definition of said predefined functionality comprises definitions of wireless application protocol wireless telephony application functions.

11. The method according to claim 1, wherein said definition of said predefined functionality comprises definitions of wireless application protocol wireless markup language script standard functions.

12. A method for use in a telecommunication environment to provide authorization by a certifying authority to a service provider to execute a predefined functionality when a service is provided by said service provider to a terminal of a user, said method comprises:

delivering a certificate, and including in said certificate a definition of said predefined functionality, said predefined functionality being part of a global functionality supported in said telecommunication environment, wherein said definition of said predefined functionality comprises definitions of wireless markup script language.

13. A method for use in a telecommunication environment to provide authorization by a certifying authority to a service provider to execute a predefined functionality when a service is provided by said service provider to a terminal of a user, said method comprises:

delivering a certificate, and including in said certificate a definition of said predefined functionality, said predefined functionality being part of a global functionality supported in said telecommunication environment, wherein said definition of said predefined functionality comprises definitions of wireless application protocol wireless telephony application functions.

14. A method for use in a telecommunication environment to provide authorization by a certifying authority to a service provider to execute a predefined functionality when a service is provided by said service provider to a terminal of a user, said method comprises:

delivering a certificate, and including in said certificate a definition of said predefined functionality, said predefined functionality being part of a global functionality supported in said telecommunication environment, wherein said definition of said predefined functionality comprises definitions of wireless application protocol wireless markup language script standard functions.

* * * * *